United States Patent [19]
Read

[11] 3,950,256
[45] Apr. 13, 1976

[54] FILTER ELEMENTS

[75] Inventor: Brian Read, Wirral, England

[73] Assignee: Fawcett Engineering Limited, Bromborough, England

[22] Filed: Apr. 1, 1974

[21] Appl. No.: 457,035

Related U.S. Application Data

[63] Continuation of Ser. No. 260,944, June 8, 1972, abandoned.

[52] U.S. Cl. .................. 210/493 R; 210/497 R
[51] Int. Cl.² ........................................ B01D 39/14
[58] Field of Search ............ 55/497, 498, 499, 521, 55/DIG. 31; 210/487, 489, 492, 493, 497; 211/57, 59; 4/185 AB, 185 F

[56] References Cited
UNITED STATES PATENTS

| | | | |
|---|---|---|---|
| 1,618,165 | 2/1927 | Boschelli | 4/185 |
| 2,016,993 | 10/1935 | Dollinger | 210/489 |
| 3,165,473 | 1/1965 | Pall et al. | 210/487 |
| 3,255,987 | 6/1966 | Gatch | 211/59 |
| 3,486,626 | 12/1969 | Close | 55/521 |
| 3,679,537 | 7/1972 | Huer et al. | 55/521 |
| 3,692,184 | 9/1972 | Miller, Jr. et al. | 210/493 |

FOREIGN PATENTS OR APPLICATIONS
1,396,322  3/1965  France ................. 210/493

*Primary Examiner*—Charles N. Hart
*Assistant Examiner*—F. F. Calvetti
*Attorney, Agent, or Firm*—Lawrence Rosen; E. Janet Berry

[57] ABSTRACT

A support structure for a pleated filter element is moulded of nylon and has parallel spaced bars joined at one face by the bases of frusto-conical fingers moulded integrally therewith. During manufacture of the element, the rows of fingers are engaged in the pleats of pleated filter medium from a pleating machine and the assembly is then curved into cylindrical shape.

9 Claims, 3 Drawing Figures

FILTER ELEMENTS

This is a continuation of Ser. No. 260,944, filed June 8, 1972, now abandoned.

BACKGROUND OF THE INVENTION

1. Field of the Invention

The present invention relates to filter elements of the pleated kind, that is to say of the kind in which the filter element is in the form of a sheet which is pleated and curved into the form of a cylinder.

2. Description of the Prior Art

It has already been proposed to improve the performance of pleated-sheet material filter elements by arranging support elements between the pleats with a view to maintaining the pleats at a predetermined spacing and preventing the pleats moving into contact with each other and thereby reducing the effective surface area of the filter element. Examples of such previously proposed arrangements are shown in U.S. Pat. Nos. 2,914,179 and 2,988,227 and French Pat. No. 1,396,322. These known constructions are relatively expensive to manufacture since they either require the support elements to be inserted by hand into the pleated sheet after it has been formed into a cylinder or they require the individual pleats to be engaged by hand between adjacent support elements. Moreover, with these known arrangements, the greater the support given to the pleats the greater is the obstruction they offer to fluid flow.

SUMMARY OF THE INVENTION

A support structure for a pleated filter element according to the invention is characterised in that the support structure comprises rows of fingers projecting from a base structure formed with passages permitting the passage therethrough of a fluid to be filtered, the base structure being sufficiently flexible to enable it to be curved to conform to the shape of a filter element when the rows of fingers are engaged in respective pleats of a pleated sheet filter medium and the latter is then curved to form the filter element with the base structure of the support member on the inner face of the filter element.

With this arrangement, the fingers may be engaged row by row in successive pleats and the assembly thus formed may be curved into cylindrical shape. The spaces between the fingers in each pleat provide ample flow cross-sections while the fingers can be designed at the appropriate spacing to support the pleat walls along the full axial length of the pleat walls.

Preferably, the fingers are tapered so as to be of larger width adjacent the base structure than at the tips of the fingers, at least in cross-section normal to the axis of the assembled filter element. For ease of manufacture, it is found advantageous to make the tapered fingers of frusto-conical shape. The filter support may then be moulded for example in nylon using a mould portion for the fingers in which each finger is divided by a frusto-conical mould cavity formed with the aid of a tapered reamer.

The length of the fingers should be at least one-third of, and preferably one-half to two-thirds of, the radial depth of the pleats of the filter element in order to provide adequate support for the pleats.

BRIEF DESCRIPTION OF THE DRAWINGS

An embodiment of the invention will now be described by way of example with reference to the accompanying drawings, in which.

DETAILED DESCRIPTION OF THE INVENTION AND PREFERRED EMBODIMENTS

Figure 1:
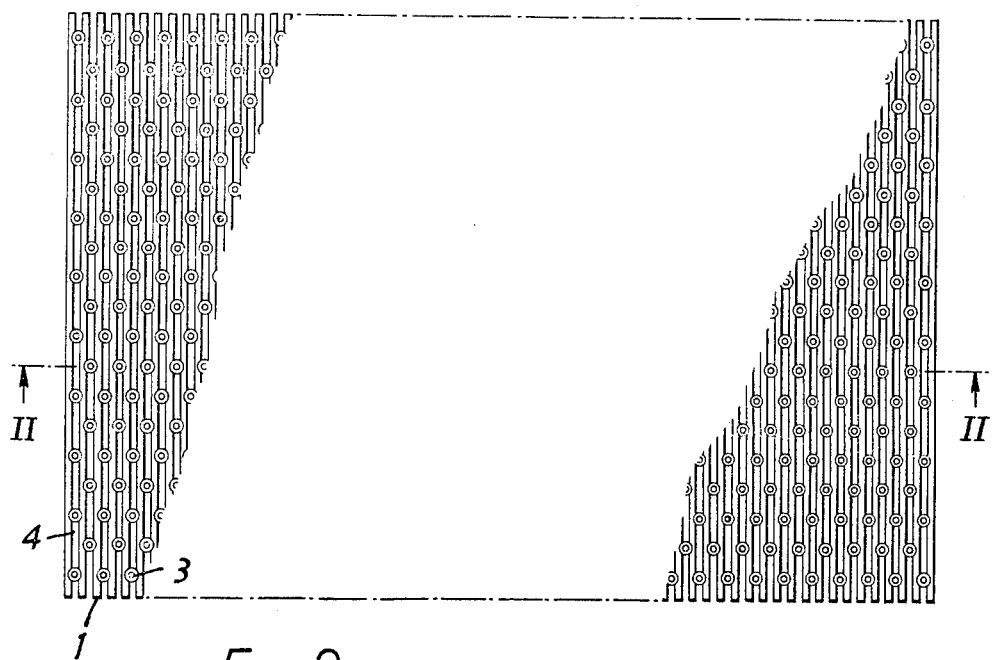
FIG. 1 is a plan view of a filter support member.
Figure 2:
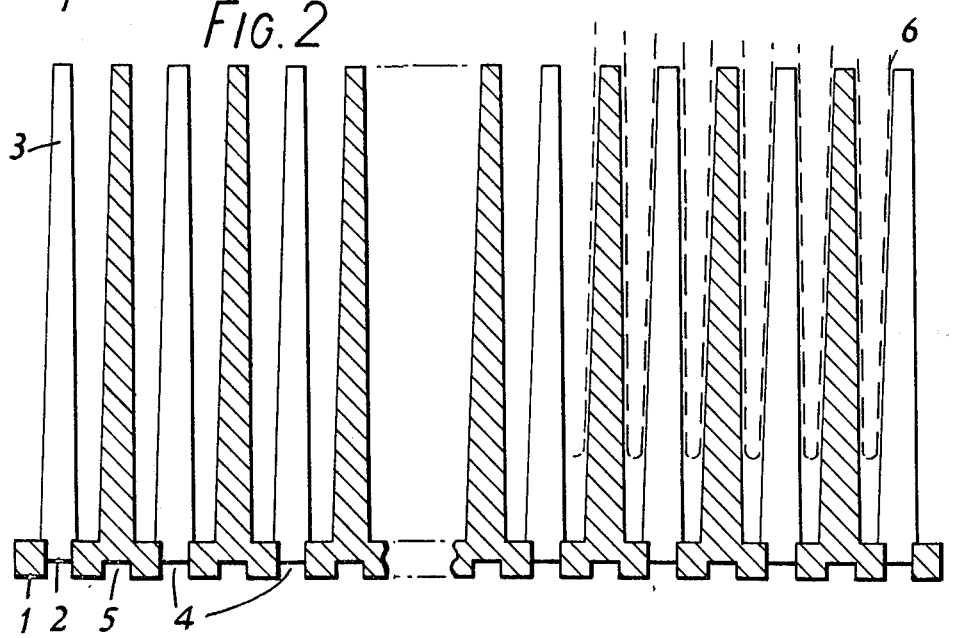
FIG. 2 shows a portion of a cross-section on the line II—II of FIG. 1.

The filter element support member shown in FIGS. 1 and 2 is integrally moulded from nylon and consists in effect of a square section bar 1 for each pleat of the filter element in which the support member is to be used. The bars 1 are spaced apart by a distance approximately equal to the width of each bar. Adjacent bars 1 are joined at regular intervals by the base portions 2 of tapering fingers 3, each of which is effectively a frustum of a cone of small vertical angle. Each pair of adjacent bars 1 thus defines a row of tapered fingers 3. It will be noted that the fingers in adjacent rows are staggered. Between the fingers 3 in each row, the bars 1 define through-flow passages 4 of large flow-section to minimize resistance to flow of fluid therethrough.

The bases 2 of the tapered fingers 3 are located at about the midpoints of the sides of the bars 1 thereby defining channels 5 under the bases 2, the channels 5 interconnecting the through-flow passages 4 on each side of each finger 3.

Figure 3:
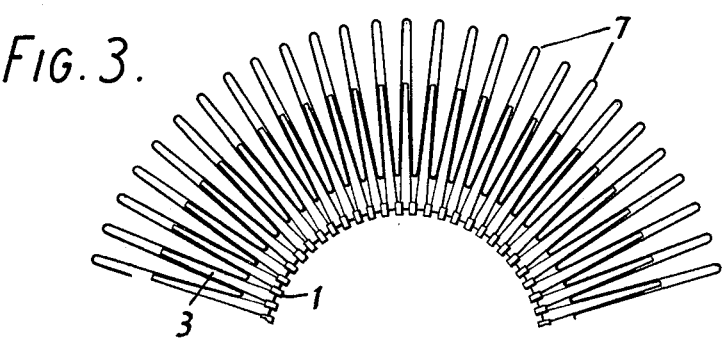
FIG. 3 shows a portion of an end view of a pleated filter element with the support member engaged therein.

During assembly of a filter element, the pleated sheet filtering medium leaves the pleating machine along a straight path. The filter support member shown in FIGS. 1 and 2 is then engaged with one side of the pleated filter medium with the edge of a pleat inserted between each adjacent pair of rows of tapered fingers 3. The positions adopted by the pleats is shown diagrammatically at 6 in the right-hand part of FIG. 2. The resulting assembly is then curved into the required cylindrical shape, part of which is shown in FIG. 3 where it will be noted that the rows of fingers 3 locate and orientate each pleat 7. Finally, the filter element may be secured in its desired shape by any appropriate means such as the conventional arrangement of a perforated outer tube (not shown), a perforated inner tube if desired, and end caps (also not shown).

A variety of sizes of filter elements can be constructed using a standard support member such as that shown in FIGS. 1 and 2. If, for example, a smaller filter element having fewer pleats is required, the appropriate number of rows of tapered fingers 3 can be cut off from the support member. If, however, a greater number of pleats is required, two or more of the support members can be placed end-to-end in the appropriate length of pleated filter medium. Similarly, the axial length of the filter element can be increased by using two or more support members arranged side-by-side to increase the number of fingers in each row. Again, the support member can be readily cut to the required length.

Further, the radial width of the pleats as seen in FIG. 3 may be varied as required within a considerable range provided that the fingers 3 extend sufficiently far into each pleat to ensure that the stiffness of the pleat wall keeps them apart and in the right position to expose substantially the whole of the surface area of the filter medium to the fluid being treated. In this connection, it will be noted that since the fingers 3 are of circular cross-section, they theoretically make line contact with the pleat walls and that accordingly in effect the amount of filtering area lost is minimal and in any case much less than that which tends to be lost as a result of the haphazard pleat dispositions found in conventional unsupported filter elements.

I claim:

1. In a pleated filter element comprising a pleated sheet filter medium formed into a cylinder, a flexible support structure disposed within said cylinder and engaging the pleats of said filter medium, the improvement in said flexible support structure comprising a base portion having a plurality of spaced parallel bars, and spaced parallel rows of fingers projecting from one surface of said base portion, adjacent bars of said base portion being held in their spaced parallel positions by root portions of said fingers, the fingers in each row being spaced from each other to define flow passages through said base structure, each said flow passage being bounded by a pair of adjacent bars and a pair of adjacent fingers.

2. The support structure of claim 1 in which said bars extend below the root portions of said fingers to define flow channels extending under said root portions and between said bars, said flow channels being parallel to said bars.

3. The support structure of claim 1, in which said fingers are tapered so as to be of larger width at their bases than at the tips of the fingers.

4. The support structure of claim 3, in which said tapered fingers are of frusto-conical shape.

5. The support structure of claim 4, in which the fingers in adjacent rows are staggered.

6. The support structure of claim 5, wherein the support member is moulded from synthetic plastics material.

7. The support structure of claim 6, in which the length of said fingers is at least one-third of the radial depth of the pleats of the sheet filter medium.

8. The support structure of claim 6, in which the length of said fingers is one-half to two-thirds of the radial depth of the pleats.

9. In a filter element comprising a pleated sheet filter medium formed into a cylinder, a flexible support structure disposed within said cylinder and comprising a base portion having a plurality of spaced parallel bars, and spaced parallel rows of fingers projecting from one surface of said base portion, the adjacent bars of said base portion being held in their spaced parallel positions by root portions of said fingers, the support structure being arranged around the inner surface of the pleated filter medium, said support structure being sufficiently flexible to be engaged with said filter medium in a flat configuration and thereafter curved with said filter element into said cylindrical configuration.

* * * * *